US005589632A

United States Patent [19]

Chevalier et al.

[11] Patent Number: 5,589,632
[45] Date of Patent: Dec. 31, 1996

[54] METHOD AND DEVICE FOR ESTIMATING THE THRUST OF A RAMJET

[75] Inventors: Alain Chevalier; Vincent Protat, both of Bourges, France

[73] Assignee: Societe Anonyme dite: Aerospatiale Societe Nationale Industrielle, Paris, France

[21] Appl. No.: 437,058

[22] Filed: May 9, 1995

[30] Foreign Application Priority Data

May 18, 1994 [FR] France .................................. 94 06058

[51] Int. Cl.[6] .................................................. G01M 15/00
[52] U.S. Cl. .......................................... 73/117.4; 73/865.6
[58] Field of Search ................................... 73/117.4, 112, 73/115, 865.6

[56] References Cited

U.S. PATENT DOCUMENTS

| 3,038,331 | 6/1962 | Henry et al. | 73/117.4 |
| 3,210,991 | 10/1965 | Weekley | 73/117.4 |
| 3,537,303 | 11/1970 | Hecht, Sr. | 73/117.4 |
| 3,788,130 | 1/1974 | Ormond | 73/117.4 |
| 4,328,703 | 5/1982 | McClure et al. | 73/117.4 |
| 4,788,855 | 12/1988 | Laskody | 73/117.4 |
| 5,170,662 | 12/1992 | Brault et al. | 73/117.4 |
| 5,235,848 | 8/1993 | Hillenbrand | 73/117.4 |

FOREIGN PATENT DOCUMENTS

| 3631923A1 | 3/1988 | Germany . | |
| 2096776 | 10/1982 | United Kingdom | 73/117.4 |

OTHER PUBLICATIONS

P. Rowe, "Laboratory Methods of Measuring Thrust," The Engineer, vol. 205, No. 5344, Jun. 27, 1958, pp. 964–967.

*Primary Examiner*—Richard Chilcot
*Assistant Examiner*—Eric S. McCall
*Attorney, Agent, or Firm*—Watson Cole Stevens Davis, P.L.L.C.

[57] ABSTRACT

The combustion chamber of the ramjet is mounted on a support which allows partial freedom of longitudinal movement. A nozzle is arranged at the intake of the combustion chamber, with a flexible, fluid-filled bladder being disposed between the nozzle and the combustion chamber. Air is blown into the combustion chamber through the nozzle, and fuel is fed into the combustion chamber to achieve combustion. The pressure of the fluid in the bladder is measured.

12 Claims, 2 Drawing Sheets

METHOD AND DEVICE FOR ESTIMATING THE THRUST OF A RAMJET

BACKGROUND OF THE INVENTION

1. Field of the Invention

The present invention relates to a method for estimating the thrust of a ramjet, a method for optimizing the combustion chamber of a ramjet as well as a device for implementing these methods.

2. Description of the Prior Art

In order to measure the thrust of engines or jet engines, in particular for aircraft, the engine to be tested is usually mounted on a particularly complex test stand. Said engine is then operated and its thrust is determined on the basis of measuring the longitudinal force generated by said engine during operation. Such a measurement requires extremely accurate and consequently complex means such as, for example, displacement transducers. The complexity of the means used on the test stand is, in particular, due to the need to determine numerous corrective terms which are used for calculating the actual thrust of the engine and are often difficult to measure such as, for example, the external drag or the base drag.

SUMMARY OF THE INVENTION

The object of the present invention, applied to a ramjet, is to overcome said drawbacks existing when determining the thrust, in the case in which the thrust of a ramjet to be determined need not be measured exactly, but merely estimated. The invention relates to a method making it possible to estimate the thrust of a ramjet simply and inexpensively.

For this purpose, according to the invention, the method for estimating the thrust of a ramjet is noteworthy in that:

a) the combustion chamber of the ramjet is mounted on means which are arranged fixed and provide said combustion chamber with partial freedom of longitudinal movement;

b) blowing means fixed are arranged at the intake of said combustion chamber, the blowing means comprising a nozzle which is fixedly mounted;

c) between said nozzle and the intake of said combustion chamber, at least one flexible bladder is arranged which is filled with a fluid and connected to a means for measuring the pressure of said fluid contained in said bladder;

d) air is blown through said nozzle into the combustion chamber, so as to create in said combustion chamber feed conditions which are identical to those existing during a defined operation of the ramjet;

e) fuel is fed to said combustion chamber so as to make it possible to generate combustion; and f) the pressure of the fluid contained in said bladder, which results from the displacement of said combustion chamber with respect to said nozzle during the combustion is measured.

Thus, since the displacement of said combustion chamber, which can move longitudinally with respect to said fixed nozzle, is due to the thrust exerted on said combustion chamber during the combustion, the pressure measured in said bladder is representative of the thrust of the ramjet and therefore provides a good estimate of this thrust.

Furthermore, the thrust is estimated using simple and inexpensive means, which saves on cost.

In addition, in order to take into account the fact that the thrust of the ramjet may be reversed and become negative, it is advantageous for the initial static pressure of the fluid in the bladder to be fixed at a positive level. It is thus possible to measure positive and negative pressure variations with respect to this level and therefore the thrust, regardless of whether it is positive or negative.

Said method according to the invention for estimating the thrust of a ramjet can be employed in numerous and varied applications. It may, for example, be used for comparing propulsion performances of various ramjets, or else for optimizing the combustion chamber of a ramjet.

To this end, the present invention furthermore relates to a method for determining, from among various internal arrangements of the combustion chamber of a ramjet, the optimum arrangement for which the ramjet presents maximum thrust, for identical operating conditions.

According to the invention, said method is noteworthy in that:

for each of said different internal arrangements of the combustion chamber, steps a) to f) of the abovementioned method for estimating the thrust of the ramjet are carried out, while recreating in each of steps d) and e) the same feed conditions in said combustion chamber;

the measured pressures of the fluid contained in the bladder are compared with each other; and the arrangement of the combustion chamber for which the pressure of the fluid in the bladder is the highest is determined to be the optimum arrangement.

Said method therefore makes it possible to optimize the combustion chamber of a ramjet, since it makes it possible to determine the internal arrangement of the combustion chamber for which the thrust of the ramjet estimated by the value of the pressure of the fluid in the bladder is the highest.

Moreover, the present invention also relates to a device for implementing any one of the aforementioned methods.

Said device advantageously comprises:

means which are arranged fixed and on which the combustion chamber of a ramjet to be tested is mounted so as to present partial freedom of longitudinal movement;

air blowing means comprising a nozzle mounted fixed, which are arranged at the intake of said combustion chamber which is provided with at least one fuel injection device;

at least one flexible bladder filled with a fluid and arranged between said nozzle and the intake of said combustion chamber; and a means, connected to said bladder, for measuring the pressure of the fluid contained in said bladder.

Said bladder may, of course, be made in different ways, for example in the form of flexible bags having a small volume distributed angularly between said nozzle and said intake face of the combustion chamber.

However, said bladder is preferably produced in the form of a closed tube, forming a torus of which the axis is coaxial with said nozzle and with said combustion chamber.

For reasons of ease of assembly, said device advantageously comprises a first connection flange solidly attached to said nozzle and a second connection flange solidly attached to the intake face of said combustion chamber, said flexible bladder being mounted between said first and second connection flanges.

In order to make it possible to measure positive and negative thrusts of the ramjet, an intermediate part is provided between said first and second connection flanges and two flexible bladders are provided, one between said first flange and said intermediate part, and the other between the latter part and said second flange.

Furthermore, advantageously, at least said first connection flange comprises a groove in which said bladder is housed, and said intermediate part arranged between said first and second connection flanges has a projecting part which penetrates into said groove and of which the external face is in contact with said flexible bladder.

Moreover, in the junction zone between said nozzle and said combustion chamber, the internal diameters of said nozzle, of said first and second connection flanges and of said combustion chamber are substantially identical, which makes it possible to obtain in said junction zone an even flow of the air blown through said nozzle into said combustion chamber.

Advantageously, said first and second connection flanges are connected together by means of clamping screws provided with an elastic system tending to bring said first and second flanges toward one another.

Thus, by tightening said screws, it is possible to create a defined initial pressure in said bladder, before feeding air into said combustion chamber.

BRIEF DESCRIPTION OF THE DRAWINGS

The figures of the attached drawing will clearly show how the invention may be embodied. In these figures, identical references denote similar elements.

DETAILED DESCRIPTION OF THE PREFERRED EMBODIMENT

Figure 1:
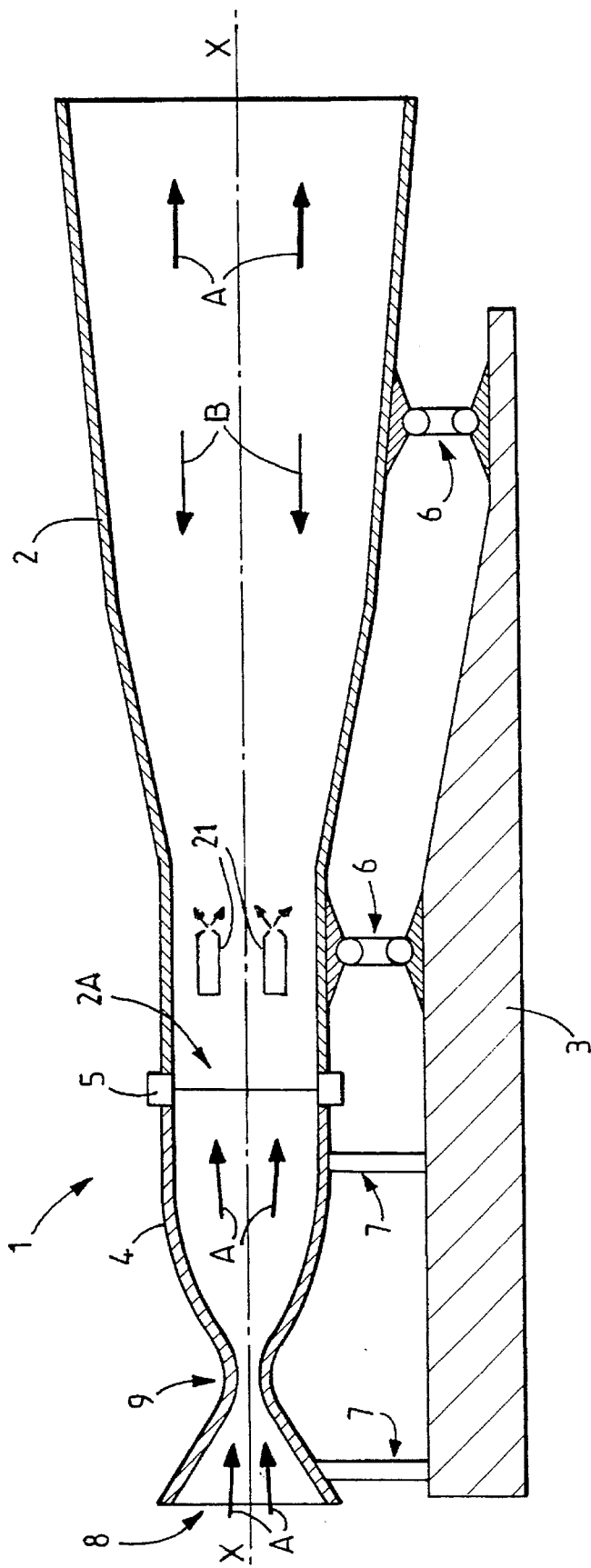
FIG. 1 is a schematic sectional view of a device according to the invention.

The device 1 according to the invention and represented in FIG. 1 is used for estimating the thrust of a ramjet. Said estimation is carried out according to the invention by mounting only the combustion chamber 2 of said ramjet to be tested on said device 1.

Figure 2:
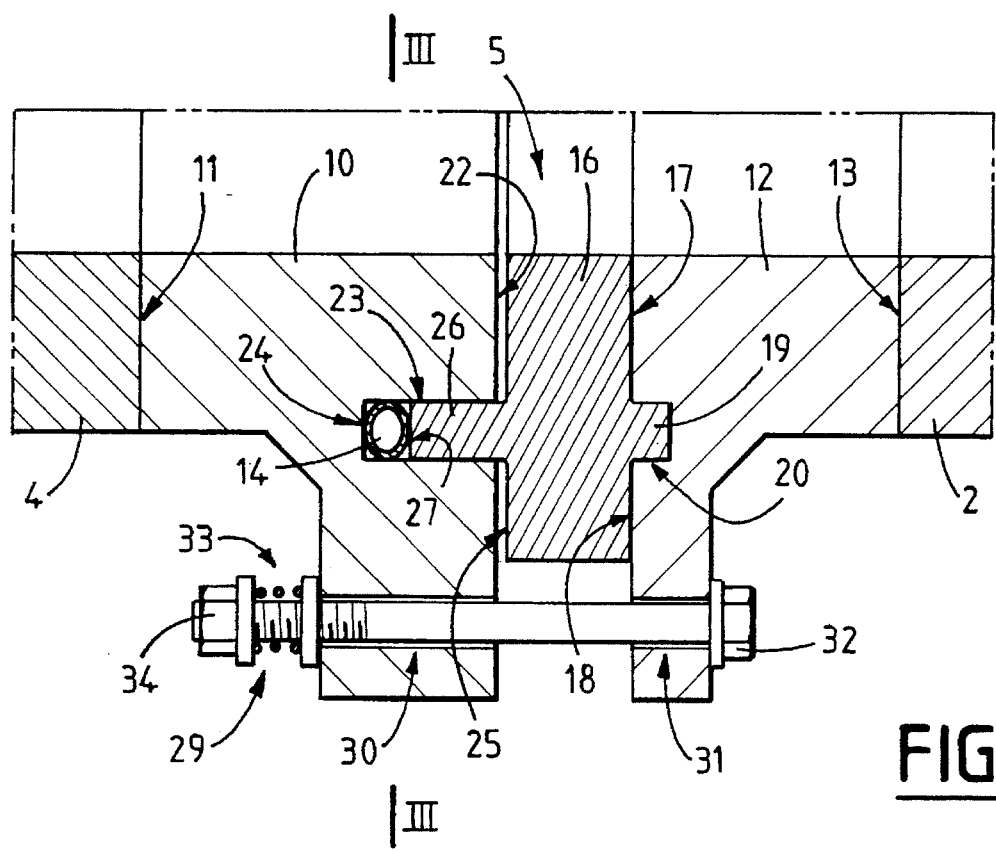
FIG. 2 is an enlarged sectional view of the junction zone, between the combustion chamber and the nozzle, schematically represented in FIG. 1.

According to the invention, said device 1 comprises:

a stationary support 3 on which said combustion chamber 2 is mounted;

air blowing means comprising a nozzle 4 fixed on said support 3 at the intake 2A of said combustion chamber 2; and elements arranged between said nozzle 4 and said combustion chamber 2, said elements, schematically indicated by the reference 5 in FIG. 1, being represented in detail in an enlarged view in FIG. 2 and described hereafter.

The combustion chamber 2, of axis X—X, is mounted on said stationary support 3 by means of articulation means 6 of known type, so that said combustion chamber 2 is immobile in the transverse direction, but has partial freedom of longitudinal movement, approximately along said axis X—X.

The axisymmetric nozzle 4 is, for its part, mounted by means of legs 7 on said support 3, coaxially with the axis X—X. Said nozzle 4 may also have a rectangular or square cross section.

Said blowing means comprise, in addition to said nozzle 4, an air feed system (not shown) arranged close to the intake face 8 of said nozzle 4, making it possible to blow air into the latter, as will be seen in more detail hereafter. Said nozzle furthermore exhibits a significant decrease in diameter in its median part 9 so as to allow flow of air through said nozzle 4 in a forced stream.

In order to facilitate assembly of the combustion chamber 2 with respect to the nozzle 4, the device 1 comprises a first connection flange 10 fixed on the rear face 11 of said nozzle 4 and a second connection flange 12 fixed on the front face 13 of the combustion chamber 2.

Figure 3:
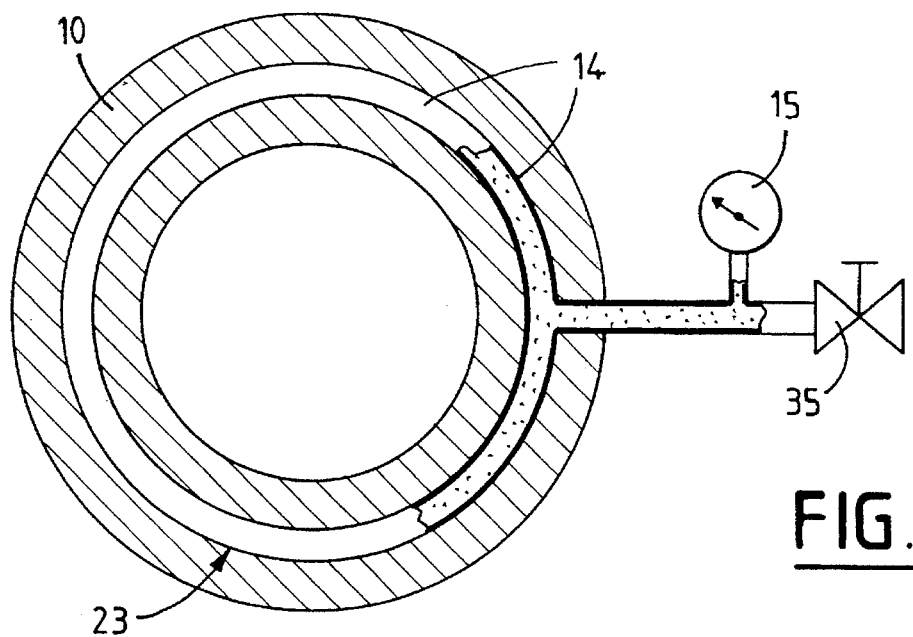
FIG. 3 is a partial schematic section along the line III—III in FIG. 2, schematically illustrating the junction between the flexible tube and the pressure measurement means.

The device 1 according to the invention furthermore comprises:

a bladder produced in the form of a flexible tube 14, for example produced of rubber or of any other material exhibiting suitable expansion characteristics, and filled with a fluid; and a means 15, represented in FIG. 3, making it possible to measure the pressure of said fluid contained in said flexible tube 14.

As can be seen in FIG. 2, an intermediate part 16 is arranged so as to cooperate between said first and second connection flanges 10 and 12.

The rear face 17 of said intermediate part 16 is arranged in contact with the front face 18 of the second connection flange 12. In order to obtain a good join between said elements, the intermediate part 16 is provided on said rear face 17 with a projecting part 19 which, in the assembled position, penetrates, with peripheral contact, into a recess 20 correspondingly formed in the front face 18 of said second connection flange 12.

The first connection flange 10 is, for its part, provided on its rear face 22, facing the intermediate part 16, with a groove 23 in which said flexible tube 14 is housed, arranged in contact with the end 24 of said groove 23. Said groove 23 has a circular shape transversely to said first connection flange 10, as can be seen in FIG. 3.

The intermediate part 16 comprises, on its front face 25, a projecting part 26 formed in correspondence with said groove 23.

When the various parts are in the assembled position, as represented in FIG. 2, the external face 27 of said projecting part 26 enters into contact with the flexible tube 14 housed in said groove 23. However, in this position, the rear face 22 of the first connection flange 10 and the front face 25 of the intermediate part 16 are not in contact. It is thus possible to bring these parts toward one another, such movement clearly leading to compression of the flexible tube 14 trapped between said end 24 of the groove 23 and said external face 27 of the projecting part 26.

Said first and second connection flanges 10 and 12 are held together by means of identical clamping screws 29 distributed radially around said parts, outside the nozzle 4 and the combustion chamber 2. Each of said clamping screws 29 passes through holes 30 and 31 made facing said connection flanges 10 and 12 and is held by its head 32 mounted on the side of the second connection flange 12. Each of said clamping screws 29 is furthermore provided, on the side opposite the head 32, with an elastic system 33 comprising, for example, a spring blocked between a nut 34 mounted on the screw 29 and the first connection flange 10.

By tightening said clamping screws 29, the second connection flange 12, and therefore the intermediate part 16 in contact therewith is brought closer to the first connection flange 10, which compresses the flexible tube 14 and increases the pressure of the fluid which it contains, which pressure can be measured using the measurement means 15. Said flexible tube 14 is provided with a valve 35 allowing it to be filled with a suitable fluid such as, for example, water, as represented in FIG. 3.

Furthermore, fuel injection devices 21 are arranged in said combustion chamber 2 toward the intake 2A of the latter, as represented in FIG. 1, said fuel injection devices 21 being intended to feed fuel to said combustion chamber 2.

According to the invention, the following operations are carried out in order to estimate the thrust of a ramjet:

the chamber 2 of the ramjet is mounted on the device 1 according to the invention, in the manner described hereinabove, said flexible tube 14 being previously filled with a fluid;

the clamping screws 29 are tightened in order to obtain a defined pressure in said flexible tube 14, this pressure serving as a reference pressure; and air is blown through said nozzle 4 into said combustion chamber 2, as illustrated by the arrows A in FIG. 1 and fuel is fed to the chamber so as to create in said combustion chamber air and fuel feed conditions which are identical to those existing during a defined operation of the ramjet and so as to generate combustion.

During the combustion, a thrust illustrated by the arrows B is exerted on the combustion chamber 2, causing displacement of said combustion chamber 2 in the direction indicated by said arrows B. This displacement is transmitted via the second connection flange 12, solidly attached to the combustion chamber 2, to the intermediate part 16 which compresses the flexible tube 14 via the projecting part 26, since the first connection flange 10 bearing said flexible tube 14 and solidly attached to said nozzle 4 is stationary.

This compression then leads to an increase in the pressure of the fluid contained in said flexible tube 14 and measured by the measurement means 15.

When, on the basis of the air and fuel feed, the desired operating conditions are retained in said combustion chamber 2, the pressure inside the flexible tube 14 is measured. This pressure is then representative of the thrust of the ramjet and therefore provides an estimate of said thrust.

Said estimation of the thrust can clearly be carried out for variable operating points, corresponding for example to operation, in a defined flight range, of an aircraft propelled by such a ramjet.

Clearly, the embodiment of the device according to the invention represented in the figures is provided only by way of example. Other embodiments are clearly possible, in particular as regards the bladder which, instead of being produced in the form of a flexible tube, may be produced, for example, in the form of flexible bags distributed angularly around the junction zone between the nozzle and the combustion chamber. The only requirement is that said bladder can be compressed as a function of the longitudinal movement of the combustion chamber and that the pressure of the fluid which it contains is therefore representative of the thrust of the ramjet.

The device 1 according to the invention may have numerous applications. For example, it may be used for comparing the thrust of various ramjets, by successively mounting the combustion chambers of these ramjets on said device 1 and by measuring the pressure inside the flexible tube when feeding air to said combustion chambers.

It is merely necessary to take care, during successive measurements:

to keep the same quantity of fluid in the flexible tube 14;

to carry out prior tightening of the clamping screws 29 so as each time to obtain the same initial pressure inside said flexible tube 14; and to recreate for each measurement the same operation conditions by monitoring the air and fuel feed.

However, the device i according to the invention is preferably used for optimizing the combustion chamber of a ramjet.

To this end, modifications of the internal arrangement of the combustion chamber are carried out with the purpose of obtaining the best possible arrangement, namely that for which the thrust of the ramjet is the highest.

To this end, according to the invention, for each of the different internal arrangements of the combustion chamber, the pressure of the fluid contained in the flexible tube 14 is measured for defined operating conditions, the combustion chamber being, of course, mounted on the device according to the invention in the manner previously described.

Since said measured pressures are representative of the thrusts obtained on the basis of the respective internal arrangements of the combustion chamber, the arrangement for which the measured pressure is the highest is therefore determined as being the best possible.

Although the invention was described hereinabove with the aid of an example in which it is clear that the thrust of the ramjet has a positive value, it is, however, clear that the device according to the present invention also makes it possible to estimate a negative thrust, on condition that the initial static pressure of the fluid in said bladder is fixed at a positive level.

It will be noted that this point is important, since, in such ramjets, the condition may arise that, for certain operating points, the thrust reverses (becomes negative) over certain specific operating ranges of said ramjets.

As a variant, for the same effect, it is possible to provide an additional bladder (not shown) between the intermediate part and the second connection flange 12 of the combustion chamber 2. This additional bladder may be arranged identically to that which is described and represented for the bladder 14.

We claim:

1. A method for estimating a thrust of a ramjet, said method comprising:

(a) mounting a combustion chamber of the ramjet on support means for providing said combustion chamber with partial freedom of longitudinal movement;

(b) arranging blowing means, comprising a nozzle which is fixed in position relative to said support means, at an intake of said combustion chamber;

(c) arranging, between said nozzle and the intake of said combustion chamber, at least one flexible bladder which is filled with a fluid;

(d) blowing air through said nozzle into the combustion chamber so as to create in said combustion chamber feed conditions which are identical to operational feed conditions existing during a defined operation of the ramjet;

(e) feeding fuel to said combustion chamber so as to generate combustion; and (f) measuring the pressure of the fluid contained in said bladder, said pressure resulting from a displacement of said combustion chamber with respect to said nozzle during the combustion.

2. The method as claimed in claim 1, further comprising setting an initial static pressure of the fluid in the bladder at a positive level.

3. The method as claimed in claim 1, further comprising:

for each of a plurality of different internal arrangements of the combustion chamber, carrying out steps (a) to (f), while recreating in each of steps d) and e) the feed conditions, which are uniform for all of the different internal arrangements, thereby obtaining a plurality of values for said pressure measured in step (f);

comparing the; plurality of values of said pressure measured in step (f) to determine which of said plurality of values is a highest value; and designating one of the internal arrangements of the combustion chamber which corresponds to the highest value to be an optimum arrangement which generates maximum thrust.

4. A device for estimating a thrust of a ramjet, said device comprising:

(a) support means, for mounting a combustion chamber of the ramjet so as to present partial freedom of longitudinal movement;

(b) air blowing means, comprising a nozzle fixed in position relative to the support means, for blowing air into an intake of said combustion chamber;

(c) at least one flexible bladder filled with a fluid and arranged at said nozzle so that when the combustion chamber is mounted on the support means, the at least one bladder is disposed between the nozzle and the intake of said combustion chamber; and (d) pressure measuring means, connected to said bladder, for measuring a pressure of the fluid contained in said at least one bladder.

5. The device as claimed in claim 4, wherein said bladder has a form of a closed tube.

6. The device as claimed in claim 4, wherein the air blowing means comprises a first connection flange solidly attached to said nozzle and disposed so as to face a second connection flange of the intake of said combustion chamber when said combustion chamber is mounted on said mounting means, said at least one flexible bladder being disposed between said first and second connection flanges when said combustion chamber is mounted on said mounting means.

7. The device as claimed in claim 6, further comprising an intermediate part for being held between said first and second connection flanges and wherein said at least one flexible bladder comprises two flexible bladders, one between said first flange and said intermediate part, and the other between the intermediate part and said second flange.

8. The device as claimed in claim 6, wherein at least said first connection flange comprises a groove in which said at least one bladder is housed, and further comprising an intermediate part for being held between said first and second connection flanges, the intermediate part having a projecting part which penetrates into said groove and having an external face which is in contact with said at least one flexible bladder.

9. The device as claimed in claim 6, wherein said nozzle and said first flange are so dimensioned that in a junction zone between said nozzle and said combustion chamber, internal diameters of said nozzle, of said first and second connection flanges and of said combustion chamber are substantially identical.

10. The device as claimed in claim 6, further comprising a plurality of clamping screws for connecting the first and second connection flanges together and an elastic means for urging first and second flanges toward each other.

11. The device as claimed in claim 8, wherein the groove is annular.

12. The device as claimed in claim 8, wherein the intermediate part has a second projecting part for engaging with a second groove in the second connection flange.

* * * * *